March 19, 1968     W. R. WISNER     3,373,540

METHOD OF BUNDLING

Filed July 13, 1965

INVENTOR.
William R. Wisner
BY Charles W. Gregg

AGENT

United States Patent Office 3,373,540
Patented Mar. 19, 1968

3,373,540
METHOD OF BUNDLING
William R. Wisner, Big Flats, N.Y., assignor to Corning Glass Works, Corning, N.Y., a corporation of New York
Filed July 13, 1965, Ser. No. 471,664
3 Claims. (Cl. 53—3)

ABSTRACT OF THE DISCLOSURE

A method of protectively bundling a succession of identical elongated articles of a frangible or otherwise damageable material by interlacing a tensilely strong supple material about and between said articles and thereafter winding the interlaced succession of articles without skew therebetween and, therefore, no possibility of physical contact therebetween.

The present invention relates to a method of bundling articles to form a protected bundle or parcel thereof for storage or shipment. More specifically this invention relates to an economical and novel method of protectively bundling a plurality or succession of identical elongate articles, having straight longitudinal axes, in preparation for wrapping or packaging such articles for handling thereof as in storing or shipping. Such articles may, for example, be rods, cylinders, tubes, or the like, made of a frangible material such as glass, or made from a material or having a coating which is readily subject to scratching or to abrasion.

Space saving and lighter-weight methods of preparing or protectively bundling articles for storing or shipping are continuously being sought. Such new methods are especially desired in relation to brittle or frangible slender or thin-walled articles such as glass tubing to be used in the manufacture of fluorescent or similar type lamp bulbs, or glass rods, cylinders or tubes to be used for any purpose, since such articles are unusually susceptible to breakage and, in being packed, must, therefore, be isolated from physical contact with each other as well as provided with protection from blows or impacts from outside sources. It is accordingly an object of the present invention to provide a novel method of bundling a plurality or succession of elongate frangible or otherwise damageable articles to prevent breakage or scratching thereof, such method being lighter weight and less bulky and, therefore, more economical than methods heretofore employed for such purpose.

In accomplishing the above object of the invention, each succeeding one of a succession of elongate frangible or otherwise damageable articles, such as glass rods for example, is securely but flexibly fastened to the immediately preceding article of such succession by at least one line or band of a tensilely strong, supple or flexible material such as string, cord, twine, thread etc.; entwined or enlaced about and between such articles in a manner such as to form a ladder-like structure enabling the entwined articles to be sinuously or spirally wound to form a compact bundle thereof without the possibility of physical contact between the articles.

Other objects and characteristic features of the invention will become apparent as the description proceeds.

The invention will best be understood with reference to the accompanying drawings in which.

Similar reference characters refer to similar parts in each of the figures of the drawings.

It is believed expedient to point out at this point in the description that the term "line" as employed herein is intended to mean any flexible or flexile length of material such as cord, twine, yarn, string, thread, elastic, rope, etc., which is sufficiently strong or tough for the purpose herein described. Such term is also intended to include any narrow tape, band, ribbon, etc., of a suitable material, such as rubber, or any fibrous or plastic material which is sufficiently supple and tough to be used for the purpose described.

It is also pointed out at this time that the phrase "elongate articles of a frangible or otherwise damageable material," is intended to mean articles such as tubes or tubing, cylinders, rods, bars, strips, etc., of glass, plastic or other brittle materials, or articles which are themselves subject to abrasion or which have coatings that are readily subject to being scratched. This may include, for example, such items as small bottles, ampules, glass piping and the like.

Figure 1:
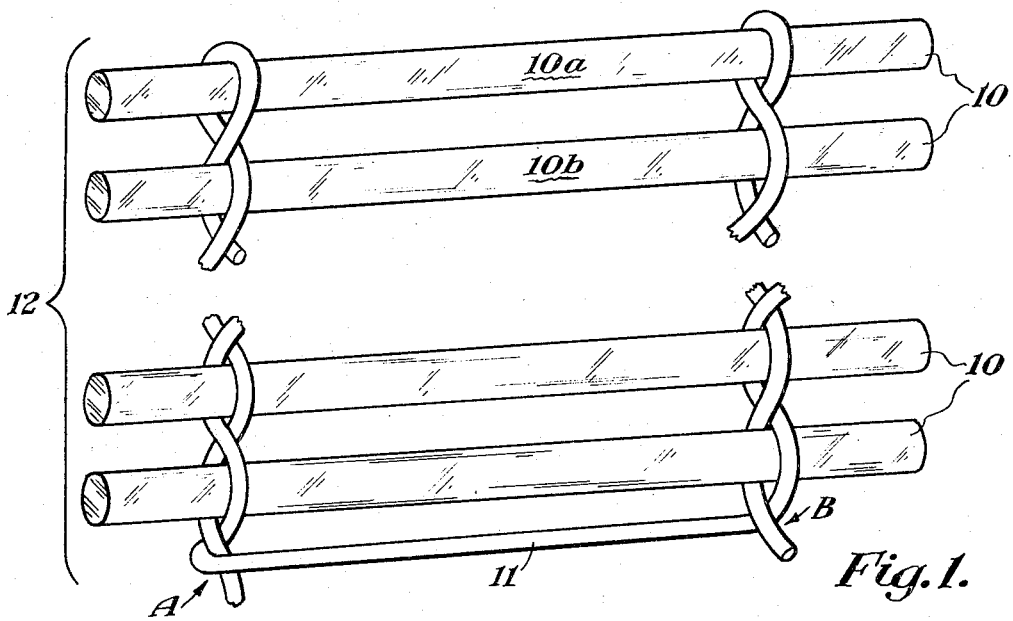
FIG. 1 is a perspective view illustrating first and second ends of a length of a ladder-like structure comprising a plurality or succession of elongate frangible articles bound together in accordance with the invention, and illustrating in detail a single form of interlacement which may be used in the binding of such articles in the practice of the invention.

Referring now to the drawings in detail, there is shown in FIG. 1 a plurality or succession of glass rods such as 10 which are to be bound together by a length of line 11 interlaced or entwined about and between such rods to form a ladder-like structure 12. Only the ends of the ladder-like structure are shown in FIG. 1 of the drawings, the part of such structure intermediate such ends, for purposes of ease of illustration, being omitted, as is readily apparent. Two of the rods have being designated 10a and 10b for a purpose that will become apparent as the description proceeds.

FIG. 1 illustrates only one method of interlacing a line or length of tensilely strong supple material, such as 11, about an between each glass rod, such as 10, and the next succeeding glass rod in accordance with the first step of the inventive method disclosed. Following such interlacement the line 11 is drawn relatively tight to pull the rods into close proximity with one another with a limited amount of flexibility of movement between each rod and the immediately preceding and succeeding ones. It is pointed out that many types of interlacement may be used about and between the successive glass rods 10 in accordance with the invention and that the interlacement illustrated is merely by way of example of a simple form thereof that may be employed. It is also pointed out that the ladder-like structure 12 may be any selected length and that two or more lines of flexible or supple material, such as 11, may be employed rather than a single length thereof as illustrated in FIG. 1. Furthermore, a ladder-like structure such as 12 may be made by a sewing machine which interlaces one or more lines, such as 11, about the rods and provides one or more stitches between successive ones of such rods while permitting limited movement therebetween for winding of the ladder-like structure as discussed below.

Figure 2:
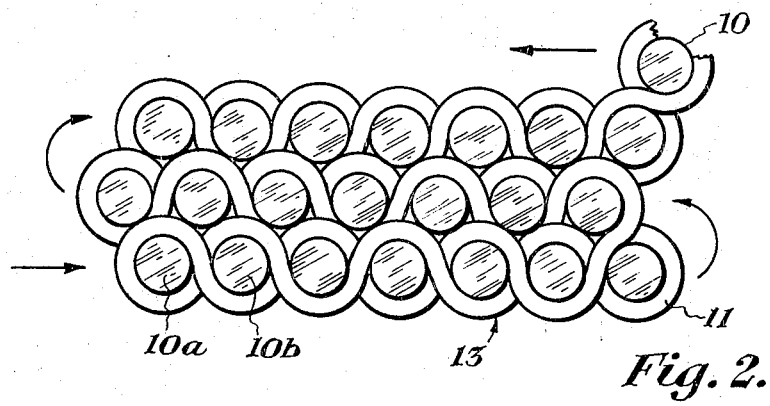
FIG. 2 is an end view of the ladder-like structure such as shown in FIG. 1 illustrating such structure wound to form a tortuous serpentine or sinuous bundle of said articles in accordance with the invention.

Referring to FIG. 2 of the drawings, there is illustrated the step of winding a ladder-like structure, made by the first step described above, to form a sinuously, tortuously or serpentinely wound bundle 13 of frangible articles such as the glass rods 10, or otherwise damageable articles. As will be understood from a brief glance at FIG. 2 of the drawings, the partial bundle shown in such drawing figure is formed by sinuously winding the ladder-like structure of rods 10 in the directions indicated by the arrows shown and with the ends of the rods even with each other. The winding of the bundle is started with rods 10a and 10b which may, for example, correspond to rods 10a and 10b of FIG. 1, and care must be taken to assure that the bundle is wound without skew between the rods of the bundle. It will be readily apparent that serpentinely wound bundles similar to that shown in FIG. 2 and having various configurations and dimensions, limited only by the length of the ladder-like structure of the frangible articles, may be formed in accordance with the second step of the inventive method disclosed.

Figure 3:
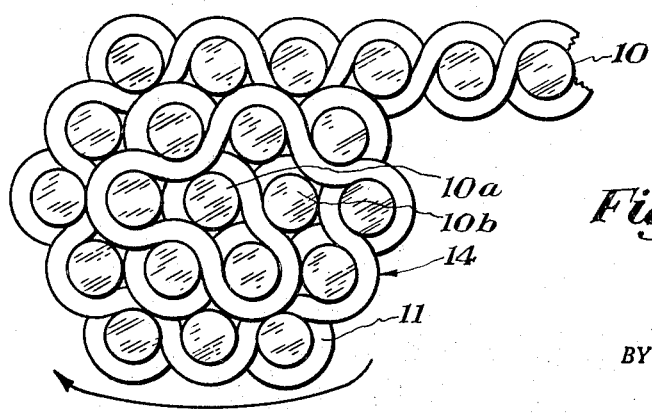
FIG. 3 is a view similar to that of FIG. 2 and illustrating the ladder-like structure wound to form a spiral bundle in accordance with the invention.

FIG. 3 of the drawings illustrates a spirally wound partial bundle 14 of frangible articles, such as 10, also formed in accordance with the second step of the invention and wound in the direction indicated by the arrow shown. Such bundle is also wound with the ends of the articles even with each other and without skew between the articles forming the bundle. The rods designated 10a and 10b in FIG. 3 of the drawings correspond to rods 10a and 10b of FIG. 1, with rod 10a being the center of the spirally wound bundle.

It is pointed out that the line or length of tensilely strong material, such as 11 shown in the drawings, in addition to being supple or flexible must also be substantially shock-absorbent, that is, must also provide a limited amount of cushioning or padding between adjacently disposed frangible articles, such as 10, of a bundle such as 13 or 14 of such articles. This is believed rather obvious in view of the purpose of the invention.

Returning briefly to FIG. 1 of the drawings, when a single length or line of binding material such as 11 is employed, such line, at the end of a ladder-like structure of a selected length, is securely knotted to itself at the points such as indicated at A and B in said drawing figure. The necessity for such knotting will be readily understood.

Following the forming of a bundle of frangible articles, such as illustrated in FIGS. 2 and 3 of the drawings for example, the bundle may be wrapped in a suitable protective material such as corrugated cardboard, or may be inserted into a suitably fitting protective carton for storage or shipment thereof. However, while the bundling method disclosed is for the purpose of economically protecting a plurality of frangible articles, or otherwise damageable articles, against breakage or abrasion during storage or shipment thereof, the wrapping or packing step per se forms no part of the present invention.

Although the inventive method herein disclosed is specifically illustrated and discussed in the bundling of glass rods, it will be understood that it is not intended that the invention be confined to such usage but that it may be employed for bundling any of the type of frangible or damageable articles previously mentioned. The exclusive rights desired and sought for the invention described are, therefore, intended to be limited only by the spirit and scope of the appended claims.

What is claimed is:

1. The method of protectively bundling a succession of identical elongate articles of a frangible or otherwise damageable material and having straight longitudinal axes, such method comprising; interlacing at least one line of a tensilely strong supple material about and between said articles to make a ladder-like structure of which each of said articles forms a crosspiece, each succeeding article of said succession of articles being arranged in a parallel relationship with and in close proximity to the immediately preceding article of such succession without skew and the resultant possibility of physical contact between such articles; and winding said ladder-like structure to form a bundle with corresponding ends of said articles evenly disposed in relationship with each other, and with such articles in compact propinquity without skew and the resultant possibility of physical contact therebetween.

2. The method in accordance with claim 1 in which said ladder-like structure is sinuously wound to form said bundle.

3. The method in accordance with claim 1 in which said ladder-like structure is spirally wound to form said bundle.

References Cited

UNITED STATES PATENTS

| | | |
|---|---|---|
| 2,300,059 | 10/1942 | Perry. |
| 2,662,649 | 12/1953 | Gill et al. 214—10.5 |
| 2,795,423 | 6/1957 | Fagergren 182—196 X |
| 2,808,222 | 10/1957 | Wassyng et al. 160—19 X |
| 2,838,453 | 6/1958 | Randall 182—196 X |
| 3,124,195 | 3/1964 | Anderson 160—19 |
| 3,186,543 | 6/1965 | Minick et al. 53—3 X |

WILLIAM W. DYER, JR., *Primary Examiner.*

TRAVIS S. McGEHEE, *Examiner.*

N. ABRAMS, *Assistant Examiner.*